(12) United States Patent
Chen et al.

(10) Patent No.: US 11,926,052 B2
(45) Date of Patent: Mar. 12, 2024

(54) ROBOT CONTROL METHOD, COMPUTER-READABLE STORAGE MEDIUM AND BIPED ROBOT

(71) Applicant: UBTECH ROBOTICS CORP LTD, Shenzhen (CN)

(72) Inventors: Chunyu Chen, Shenzhen (CN); Yizhang Liu, Shenzhen (CN); Ligang Ge, Shenzhen (CN); Zheng Xie, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 640 days.

(21) Appl. No.: 17/133,575

(22) Filed: Dec. 23, 2020

(65) Prior Publication Data

US 2021/0197370 A1 Jul. 1, 2021

(30) Foreign Application Priority Data

Dec. 27, 2019 (CN) .......................... 201911377654.5

(51) Int. Cl.
*B25J 9/16* (2006.01)
*B62D 57/032* (2006.01)
*G05D 1/00* (2006.01)

(52) U.S. Cl.
CPC ............... *B25J 9/163* (2013.01); *B25J 9/162* (2013.01); *B25J 9/1664* (2013.01); *B62D 57/032* (2013.01); *G05D 1/02* (2013.01)

(58) Field of Classification Search
CPC .......... B25J 9/163; B25J 9/162; B25J 9/1664; B62D 57/032; G05D 1/02; G05D 2201/0217
See application file for complete search history.

(56) References Cited

U.S. PATENT DOCUMENTS

| | | | | |
|---|---|---|---|---|
| 7,942,221 B1 * | 5/2011 | Tilden | .................. | B62D 57/032 180/8.1 |
| 2009/0069941 A1 * | 3/2009 | Honda | .................. | B62D 57/032 700/258 |
| 2009/0132087 A1 * | 5/2009 | Pratt | .................... | B62D 57/032 901/1 |
| 2012/0158182 A1 * | 6/2012 | Lee | .......................... | B25J 9/162 901/16 |
| 2013/0158712 A1 * | 6/2013 | Lee | ...................... | B62D 57/032 901/1 |
| 2018/0004208 A1 * | 1/2018 | Su | .......................... | G05D 1/021 |
| 2021/0141443 A1 * | 5/2021 | Fukumoto | ........... | G06F 3/04815 |

* cited by examiner

*Primary Examiner* — Jaime Figueroa
*Assistant Examiner* — Mohamad O El Sayah

(57) ABSTRACT

A robot control method includes: acquiring distances between a center of mass (COM) of the biped robot and each of preset key points of feet of the biped robot, and acquiring an initial position of the COM of the biped robot; calculating a position offset of the COM based on the distances; adjusting the initial position of the COM based on the position offset of the COM to obtain a desired position of the COM of the biped robot; and determining desired walking parameters of the biped robot based on the desired position of the COM by using a preset inverse kinematics algorithm, wherein the desired walking parameters are configured to control the biped robot to walk.

20 Claims, 9 Drawing Sheets

ROBOT CONTROL METHOD, COMPUTER-READABLE STORAGE MEDIUM AND BIPED ROBOT

CROSS REFERENCE TO RELATED APPLICATIONS

This application claims priority to Chinese Patent Application No. CN201911377654.5, filed Dec. 27, 2019, which is hereby incorporated by reference herein as if set forth in its entirety.

BACKGROUND

1. Technical Field

The present disclosure generally relates to robots, and particularly to a control method for controlling a biped robot.

2. Description of Related Art

It is important for biped robots to maintain a stable walking state in various environments. However, when some conventional biped robots whose centers of mass are relatively high are walking on a small slope, the line of gravity of the robots may fall outside of the small slope, which may cause the biped robots to fall during the walking on the small slope. Therefore, there is a need to provide a robot control method to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
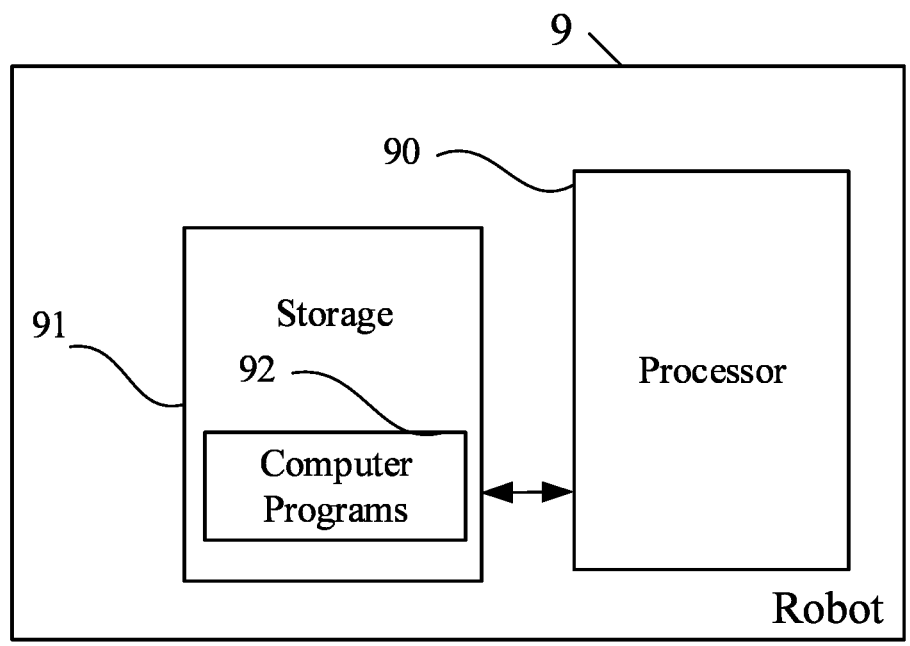
FIG. 1 is a schematic block diagram of a biped robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 9:
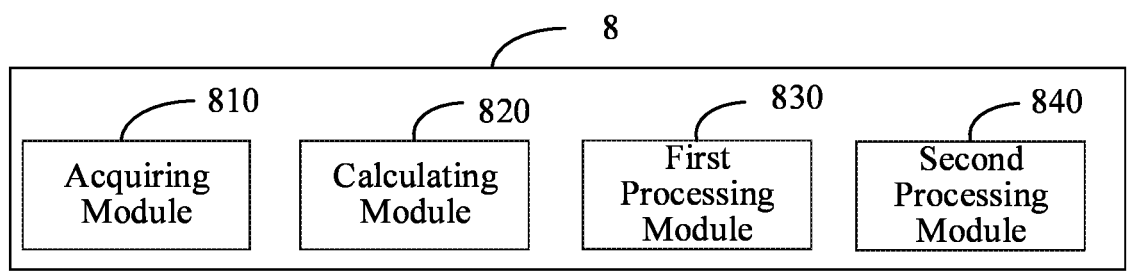
FIG. 9 is a schematic block diagram of a control device according to one embodiment.

FIG. 1 is a schematic block diagram of a robot 9 according to one embodiment. The robot 9 may be a biped robot. The robot 9 includes a processor 90, a storage 91, one or more computer programs 92 stored in the storage 91 and executable by the processor 90. When the processor 90 executes the computer programs 92, the steps in the embodiments of the method for controlling the robot 9, such as steps S101 through S104 in FIG. 2, steps S1011 to S1012 in FIG. 4, steps S1041 to S1042 in FIG. 5, steps S201 through S206 in FIG. 6, steps S2031 through S2033 in FIG. 7, and steps S301 through S307, and functions of modules/units in the embodiments, such as units 810 through 840 in FIG. 9, are implemented.

Exemplarily, the one or more computer programs 92 may be divided into one or more modules/units, and the one or more modules/units are stored in the storage 91 and executed by the processor 90. The one or more modules/units may be a series of computer program instruction segments capable of performing specific functions, and the instruction segments are used to describe the execution process of the one or more computer programs 92 in the robot 9. For example, the one or more computer programs 92 may be divided into an acquiring module, a calculating module, a first processing module, and a second processing module. The specific functions of each module will be described in detail later.

It should be noted that FIG. 1 is merely an example of the robot 9, and does not limit the robot 9. The robot 9 may include components different in numbers from those illustrated, or incorporate some other different components. For example, the robot 9 may further include an input and output device, a network access device, a bus, and the like.

The processor 90 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 91 may be an internal storage unit of the robot 9, such as a hard disk or a memory. The storage 91 may also be an external storage device of the robot 9, such as a plug-in hard disk, a smart memory card (SMC), and a secure digital (SD) card, or any suitable flash cards. Furthermore, the storage 91 may also include both an internal storage unit and an external storage device. The storage 91 is used to store computer programs, other programs, and data required by the robot. The storage 91 can also be used to temporarily store data that have been output or is about to be output.

Figure 2:
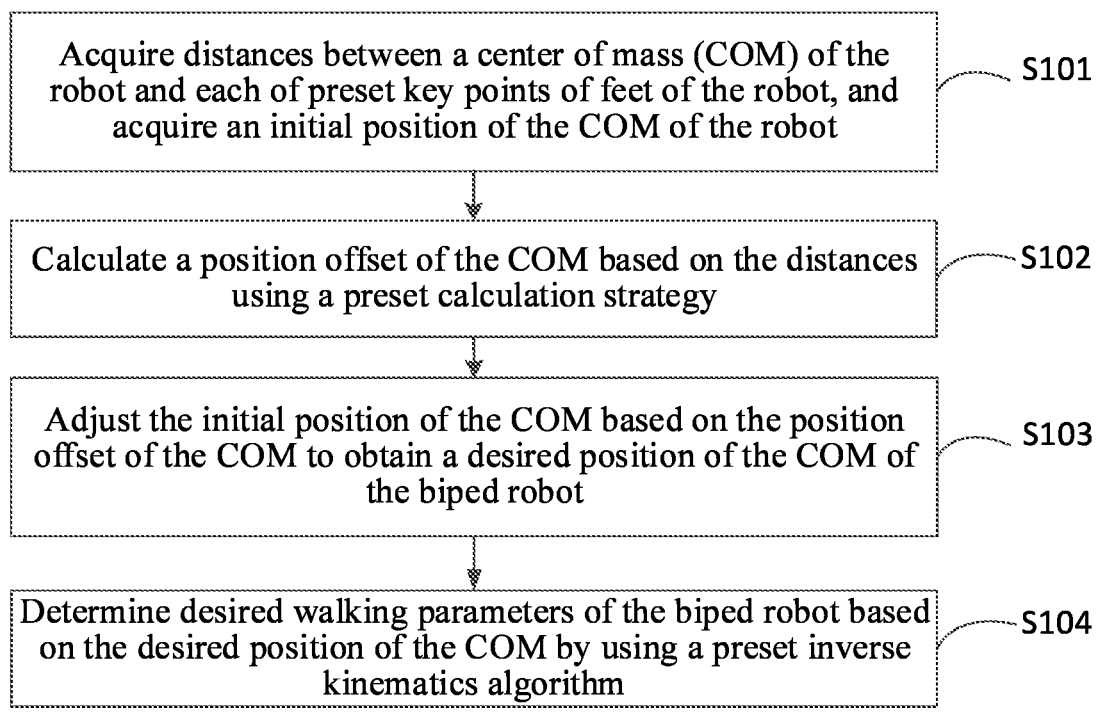
FIG. 2 is a schematic flowchart of a robot control method according to a first embodiment.

FIG. 2 shows an exemplary flowchart of robot control method for controlling a biped robot according to a first embodiment, which may include the following steps.

Step S101: Acquire distances between a center of mass (COM) of the biped robot 9 and each of preset key points of feet of the biped robot 9, and acquire an initial position of the COM of the biped robot 9.

Figure 3:
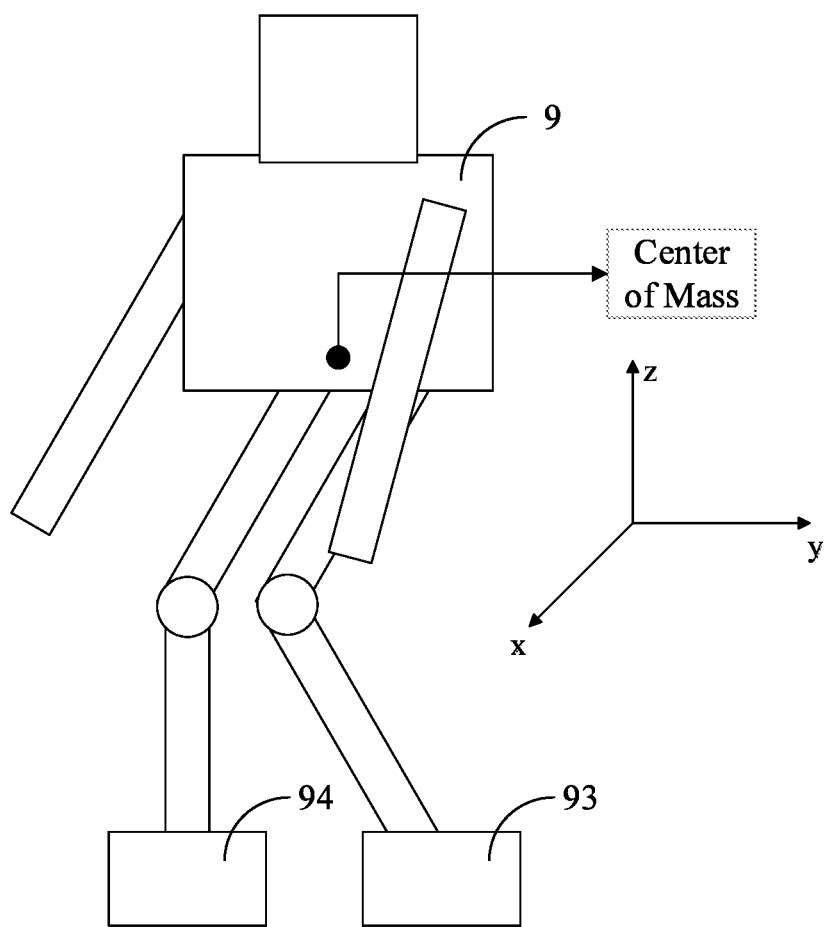
FIG. 3 is a schematic diagram showing a biped robot according to one embodiment.

In one embodiment, the biped robot 9 can acquire distances between a center of mass (COM) of the biped robot 9 and each of preset key points of feet of the biped robot 9, and acquire an initial position of the COM of the biped robot 9 in a gait cycle. If a force is applied to the center of mass of a system, the system will move in the direction of the force without rotating. The COM of the biped robot 9 can generally be obtained in advance according to actual situations. FIG. 3 shows the COM of the biped robot 9 in a standing state. Based on the destination of the robot 9, the motion trajectory can be determined, so that the initial position of the COM of the robot 9 can be determined. During the walking process of the biped robot 9, the position of the center of mass of the biped robot 9 shifts from side to side and does not move along a stable trajectory, in order to achieve dynamic balance. Therefore, in order to maintain the stability of the biped robot 9, the initial trajectory of the COM of the robot 9 needs to be adjusted.

The key points of the feet are preset in the biped robot, and the positions of the key points of the feet are preset on the left foot and right foot of the biped robot. The biped robot can acquire the distances between the COM and the preset key points of the feet of the robot. In a preset gait cycle, the biped robot is walking and can obtain multiple values of the distances between a center of mass (COM) of the biped robot 9 and each of preset key points of feet of the biped robot 9.

Figure 4:
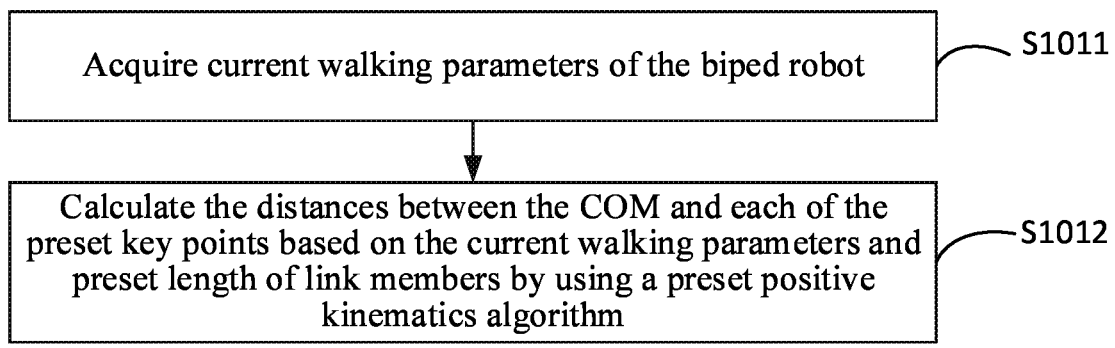
FIG. 4 is a schematic flowchart of a method for acquiring distances between a center of mass (COM) of the biped robot and each of preset key points of feet of the biped robot according to one embodiment.

Referring to FIG. 4, in one embodiment, acquiring distances between a center of mass (COM) of the biped robot 9 and each of preset key points of feet of the biped robot 9 in step S101 may further include the following steps.

Step S1011: Acquire current walking parameters of the biped robot 9. In one embodiment, the current walking parameters can include the joint angles and posture angles of the robot, and can be obtained through the sensors of the biped robot.

Step S1012: Calculate the distances between the COM and each of the preset key points based on the current walking parameters and preset length of link members by using a preset positive kinematics algorithm.

Kinematics is the description of the motion of a robot. Robot kinematics includes forward kinematics and inverse kinematics. In forward kinematics, joint angles are the inputs, and the outputs would be the position and orientation of the end-effectors of a robot. In inverse kinematics, the given inputs are position and orientation of the end-effectors, the outputs to calculate are the joint angles. Based on the geometrical parameters of the links and joint angle of the biped robot, the position and pose of the end effectors relative to a reference coordinate system can be determined. In the embodiment, the current walking parameters include the joint angles of the biped robot, and the preset length of the link members is the geometric parameters of the link members of the biped robot. Based on the current walking parameters, the preset length of the link members, the biped robot can calculate the distances between the COM and each of the preset key points of the feet of the robot using a forward kinematics algorithm.

Step S102: Calculate a position offset of the COM based on the distances using a preset calculation strategy.

The preset calculation strategy is pre-stored in the biped robot, and the preset calculation strategy is used to calculate the position offset of the COM of the biped robot. The position offset of the COM of the biped robot is used to adjust the initial trajectory of the COM of the biped robot, so that the COM is as close to the center of the support area where the biped robot is walking, thereby ensuring the stability of the biped robot. In the embodiment, the preset calculation strategy is not limited, as long as the position offset of the COM can be calculated based on the distances. The biped robot calculates the distances using the preset calculation strategy to obtain the position offset of the COM.

Step S103: Adjust the initial position of the COM based on the position offset of the COM to obtain a desired position of the COM of the biped robot.

The desired position of the COM of the biped robot is the adjusted position of the COM of the biped robot, and the biped robot can adjust some current walking parameters based on the adjusted position of the COM of the biped robot to maintain stability.

Step S104: Determine desired walking parameters of the biped robot based on the desired position of the COM by using a preset inverse kinematics algorithm, wherein the desired walking parameters are configured to control the biped robot to walk.

Kinematics is the description of the motion of a robot. Robot kinematics includes forward kinematics and inverse kinematics. In forward kinematics, joint angles are the inputs, and the outputs would be the position and orientation of the end-effectors of a robot. In inverse kinematics, the given inputs are position and orientation of the end-effectors, the outputs to calculate are the joint angles. Based on the position and pose of the biped robot, the specific motion form of the robot can be determined using a pre-stored inverse kinematics algorithm, and the specific motion form can be reflected in the form of specific walking parameters. The biped robot can determine the desired walking parameters based on the desired position of the COM using the pre-stored inverse kinematics algorithm. The desired walking parameters are used to control the biped robot to walk.

Figure 5:
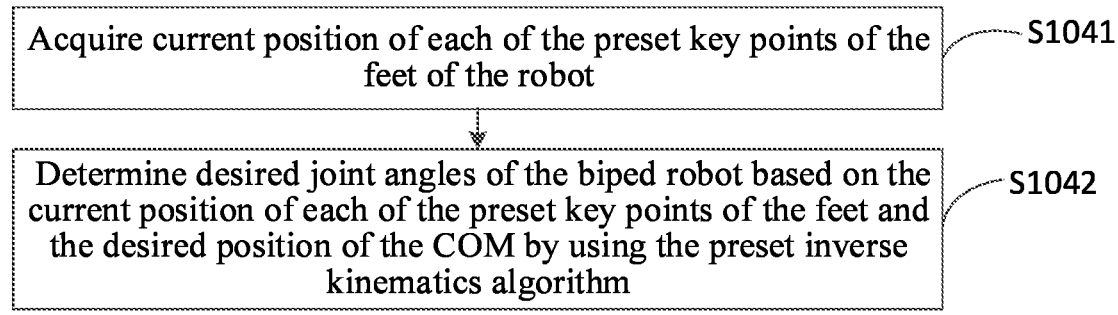
FIG. 5 is a schematic flowchart of a method for determine desired walking parameters of the biped robot according to one embodiment.

Referring to FIG. 5, in one embodiment, the step S104 may further include the following steps so as to accurately obtain desired walking parameters.

Step S1041: Acquire current position of each of the preset key points of the feet of the robot 9.

The preset key points may include a key point of the left foot 93 (see FIG. 3) and a key point of the right foot 94 (see FIG. 3) of the biped robot. The current position of the preset key points of the feet may be in the form of coordinates.

Step S1042: Determine desired joint angles of the biped robot based on the current position of each of the preset key points of the feet and the desired position of the COM by using the preset inverse kinematics algorithm.

The biped robot can determine desired joint angles of the biped robot based on the current position of each of the preset key points of the feet and the desired position of the COM by using the preset inverse kinematics algorithm. The desired joint angles of the biped robot are used to control the biped robot to walk. The joint angles of the two legs of the biped robot can be calculated using inverse kinematics calculation and can be expressed as $\theta_l = [\theta_{l1}\ \theta_{l2}\ \theta_{l3}\ \theta_{l4}\ \theta_{l5}\ \theta_{l6}]^T$ and $\theta_r = [\theta_{r1}\ \theta_{r2}\ \theta_{r3}\ \theta_{r4}\ \theta_{r5}\ \theta_{r6}]^T$, thereby realizing the modification control of the position of the COM of the biped robot.

With the above-mentioned method, the position of the COM of the biped robot is adjusted to fall within the area between the feet of the robot by obtaining the position offset of the COM, such that the robot can walk stably on a slope.

Figure 6:
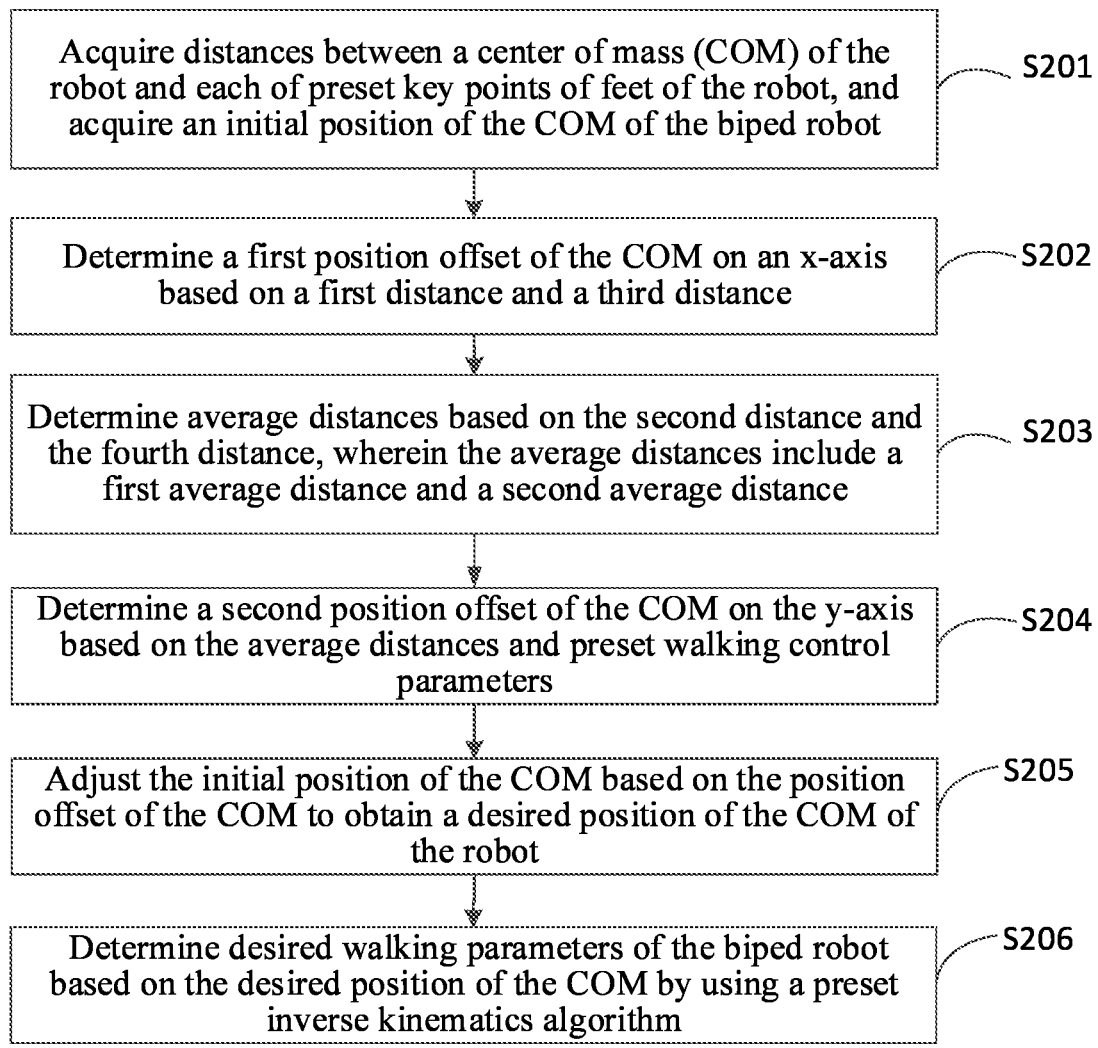
FIG. 6 is a schematic flowchart of a robot control method according to a second embodiment.

FIG. 6 shows a flowchart of a robot control method according to a second embodiment. In the embodiment, the method is executed by a biped robot. The differences between the second embodiment and the first embodiment above lies in steps S202~S204. Step S201 in the second embodiment is the same as step S101 in the first embodiment above, and S205~S206 in the second embodiment are the same as steps S103~S104 in the first embodiment above. Steps S202 to S204 are further refinements of step S102, which are as follows:

Step S202: Determine a first position offset of the COM on an x-axis based on a first distance and a third distance.

In one embodiment, the preset key points include a key point of a left foot of the biped robot and a key point of a right foot of the biped robot. The distances described above include the first distance measured between the COM and the key point of the left foot along the x-axis, a second distance measured between the COM and the key point of the left foot along a y-axis, the third distance measured between the COM and the key point of the right foot along the x-axis, and a fourth distance measured between the COM and the key point of the right foot along the y-axis. In the embodiment, the walking direction of the robot is defined as the positive direction of the x-axis, and an axis on the frontal plane of the robot and perpendicular to the x-axis is defined as the y-axis.

The biped robot can determine the first position offset of the COM on the x-axis based on the x-axis calculation coefficient, preset walking control parameters, and the current acceleration. The biped robot can determine the x-axis calculation coefficient based on the first distance dLx and the third distance dRx. For example, the x-axis calculation coefficient dx can be determined according to an equation as follows: dx=0.5×(dLx+dRx). It should be noted that the equation above is merely an example, and the x-axis calculation coefficient may be calculated according to other equations according to actual needs. In one embodiment, the first position offset of the COM on the x-axis can be calculated according to equations as follows: Xacc=kp×(0−dx)+kd×(0−Xvel); Xvel=Xvel0+Xacc×t; and DeltaX=Xvel×t+0.5×Xacc×t, where Xacc represents the acceleration of the COM on the x-axis, Xvel0 represents the initial velocity of the COM on the X-axis at the current moment, DeltaX represents the first position offset of the COM on the x-axis, and Xd represents the initial position of the COM of the robot.

StepS 203: Determine average distances based on the second distance and the fourth distance, wherein the average distances include a first average distance and a second average distance, the first average distance is an average value of values of the second distance measured in a gait cycle, and the second average distance is an average value of values of the fourth distance measured in a gait cycle.

In the embodiment, the biped robot obtains values of the second distance and the fourth distance in one gait cycle. That is, the data on the Y-axis direction is the data collected during the preset gait cycle. The average distances are determined according to the second distance and the fourth distance of the biped robot. The average distances include a first average distance and a second average distance. The first average distance is an average value of values of the second distance measured in a gait cycle, and the second average distance is an average value of values of the fourth distance measured in a gait cycle.

In order to improve the data quality of the obtained distances and ensure that the number of values of the distances is fixed, step S203 may include: determining the average distances based on the distances when a length of an array corresponding to the distances is equal to a preset array length, wherein the average distances are average values of values of the second distance and the fourth distance measured in a gait cycle. In the embodiment, the second distance is measured between the COM and the key point of the left foot along a y-axis, and the fourth distance is measured between the COM and the key point of the right foot along the y-axis. The array length is pre-stored in the biped robot. The preset array length is determined according to the gait cycle of the biped robot. The data of the preset array length is the values of the second distance and the fourth distance collected by the biped robot in one gait cycle. When the array length corresponding to the distances is equal to the preset array length, the distances do not need to be updated, and average distances are determined based on the distances.

Step S204: Determine a second position offset of the COM on the y-axis based on the average distances and preset walking control parameters.

In one embodiment, the biped robot pre-stores walking control parameters. The preset walking control parameters are the controller parameters of the biped robot, and the preset walking control parameters are used to control the biped robot to walk. The biped robot can determine the second position offset of the COM on the y-axis based on the average distances and preset walking control parameters.

Figure 7:
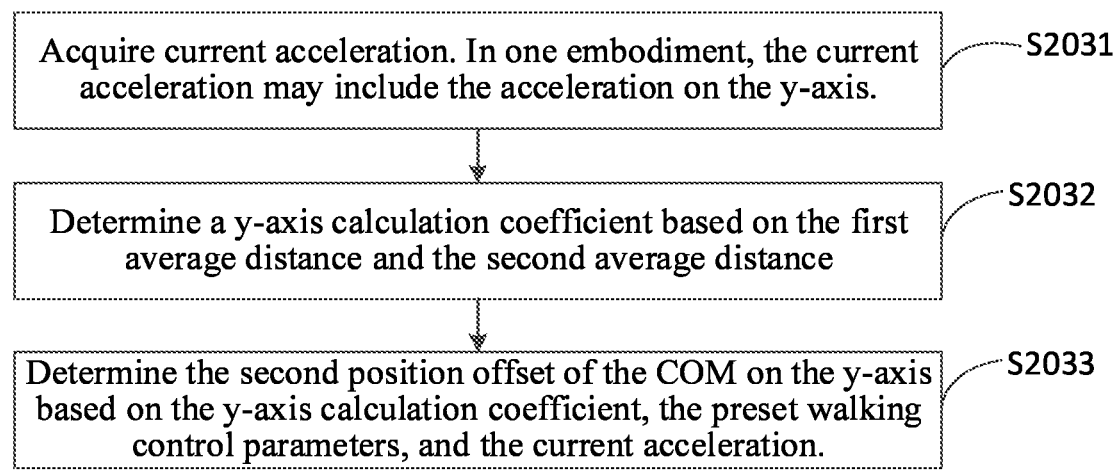
FIG. 7 is a schematic flowchart of a method for determining average distances based on a second distance and a fourth distance according to one embodiment.

Referring to FIG. 7, in order to obtain the position offset of the COM accurately, S203 may include S2031~S2033 as follows.

Step S2031: Acquire current acceleration. In one embodiment, the current acceleration may include the acceleration of the COM on the y-axis.

Step S2032: Determine a y-axis calculation coefficient based on the first average distance and the second average distance.

In one embodiment, the y-axis calculation coefficient can be calculated according to an equation as follows: dy=0.5×(dLy_avg+dRy_avg), where dy represents the y-axis calculation coefficient, dLy_avg represents the first average distance, and dLy_avg represents the second average distance. It should be noted that the equation above is merely an example, and the y-axis calculation coefficient can be calculated according to other equations according to actual needs.

Step S2033: Determine the second position offset of the COM on the y-axis based on the y-axis calculation coefficient, the preset walking control parameters, and the current acceleration of the COM on the y-axis.

In one embodiment, the second position offset of the COM on the y-axis can be calculated according to equations as follows: Yacc=kp×(0−dy)+kd×(0−Yvel); Yvel=Yvel0+Yacc×t; DeltaY=Yvel×t+0.5×Yacc×t, where Yacc represents the acceleration on the y-axis, kp and kd are preset walking control parameters, Yvel represents the desired velocity on the y-axis, DeltaY represents the second position offset of the COM on the y-axis, and Yd represents the initial position of the COM of the robot.

Figure 8:
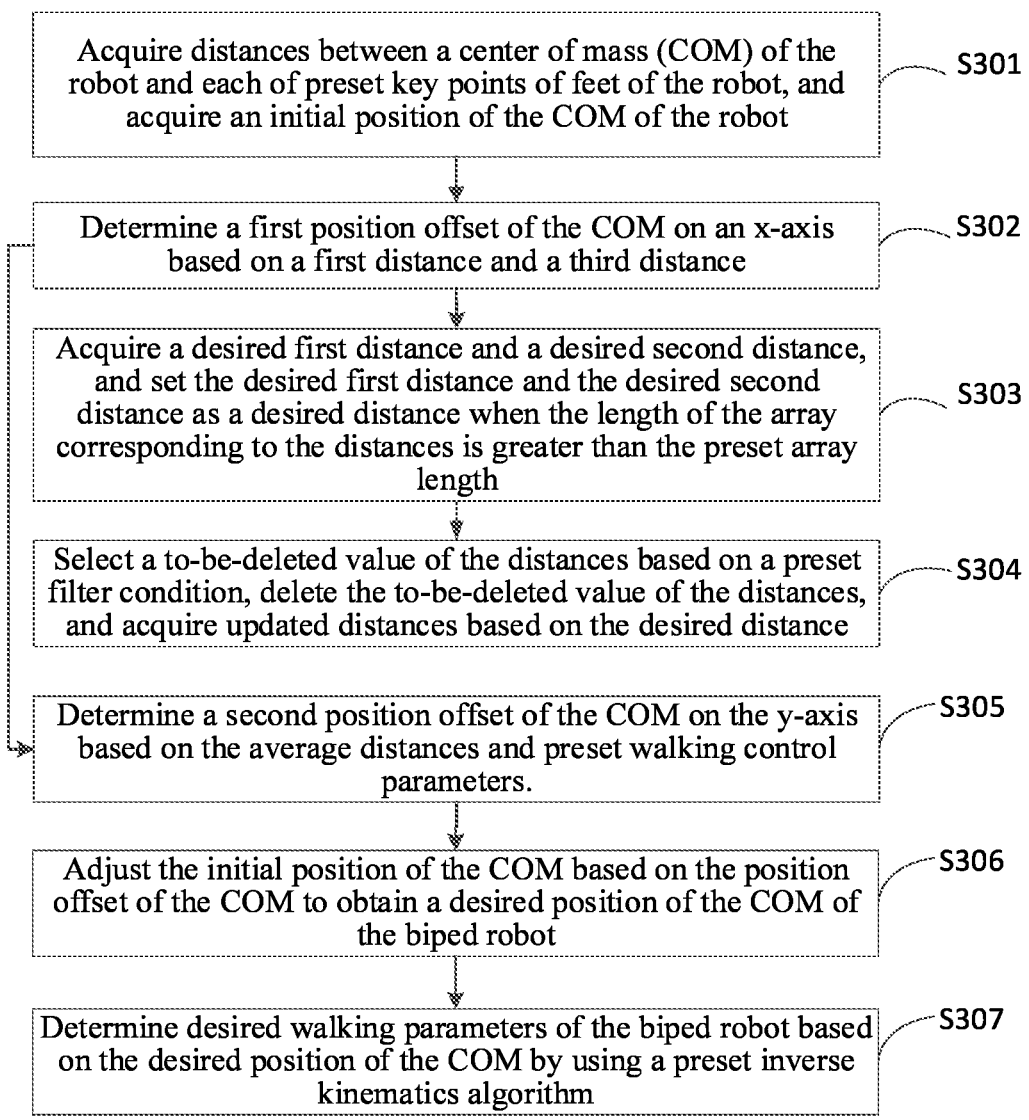
FIG. 8 is a schematic flowchart of a robot control method according to a third embodiment.

FIG. 8 shows a robot control method according to a third embodiment. The method is executed by the biped robot 9. In order to improve the data quality of the obtained distances and ensure that the number of values of the distances is fixed so as to accurately obtain the position offset of the COM of the biped robot, the difference between the third embodiment and the second embodiment lies in steps S303~S304. Steps S301~S302 in the third embodiment are the same as steps S201~S202 in the second embodiment. Steps S305~S307 in the third embodiment are the same as steps S204~S206 in the second embodiment. Steps S303~S304 can be executed after step S302.

Step S303: Acquire a desired first distance and a desired second distance, and set the desired first distance and the desired second distance as a desired distance when the length of the array corresponding to the distances is greater than the preset array length.

The desired first distance and the desired second distance are new distance data obtained after the distances have been obtained. In order to ensure that the length of the array corresponding to the distances is fixed, that is, to ensure that the values of the distances are the data collected in one gait cycle, the earliest received data of the current distances can be deleted when new data is acquired, and then the new data can be added.

Step S304: Select a to-be-deleted value of the distances based on a preset filter condition, delete the to-be-deleted value of the distances, and acquire updated distances based on the desired distance.

In one embodiment, the to-be-deleted value of the distances can be the earliest acquired value. The biped robot deletes the to-be-deleted value of the distances, and then generates new distances based on the desired distance and the values of the distances except the to-be-deleted value. For example, [A, B, C, D] are the values of a distance measured in the current cycle, and now a desired distance E has been collected. The earliest acquired value A will be deleted, and then the new collected desired distance E will be added to generate a new distance [B, C, D, E].

In the embodiments above, the description of each embodiment has its own emphasis. For parts that are not detailed or described in one embodiment, reference may be made to related descriptions of other embodiments.

FIG. 9 shows a robot control device 8 according to one embodiment. The robot control device 8 may include an acquiring module 810, a calculating module 820, a first processing module 830, and a second processing module 840.

The acquiring module 810 is configured to acquire distances between a center of mass (COM) of the biped robot and each of preset key points of feet of the biped robot, and acquiring an initial position of the COM of the biped robot. The calculating module 820 is configured to calculate a position offset of the COM based on the distances. The first processing module 830 is configured to adjust the initial position of the COM based on the position offset of the COM to obtain a desired position of the COM of the biped robot. The second processing module 840 is configured to determine desired walking parameters of the biped robot based on the desired position of the COM by using a preset inverse kinematics algorithm, wherein the desired walking parameters are configured to control the biped robot to walk.

In one embodiment, the preset key points include a key point of a left foot of the biped robot and a key point of a right foot of the biped robot. The distances described above include the first distance measured between the COM and the key point of the left foot along the x-axis, a second distance measured between the COM and the key point of the left foot along a y-axis, the third distance measured between the COM and the key point of the right foot along the x-axis, and a fourth distance measured between the COM and the key point of the right foot along the y-axis. In the embodiment, the walking direction of the robot is defined as the positive direction of the x-axis, and an axis on the frontal plane of the robot and perpendicular to the x-axis is defined as the y-axis.

In one embodiment, the calculating module 820 may include a first determining module, a second determining module, and a third determining module. The first determining module is configured to determine a first position offset of the COM on an x-axis based on a first distance and a third distance. The second determining module is configured to determine average distances based on the second distance and the fourth distance, wherein the average distances include a first average distance and a second average distance, the first average distance is an average value of values of the second distance measured in a gait cycle, and the second average distance is an average value of values of the fourth distance measured in a gait cycle. The third determining module is configured to determine a second position offset of the COM on the y-axis based on the average distances and preset walking control parameters.

In one embodiment, the third determining module is further configured to: acquire a current acceleration of the COM on the y-axis; determine a y-axis calculation coefficient based on the first average distance and the second average distance; and determine the second position offset of the COM on the y-axis based on the y-axis calculation coefficient, the preset walking control parameters, and the current acceleration of the COM on the y-axis.

In one embodiment, the acquiring module 810 is further configured to: acquire current walking parameters of the biped robot, and calculate the distances between the COM and each of the preset key points based on the current walking parameters and preset length of link members by using a preset positive kinematics algorithm.

In one embodiment, the second determining module is further configured to determine the average distances based on the distances when a length of an array corresponding to the distances is equal to a preset array length, wherein the average distances are average values of values of the second distance and the fourth distance measured in a gait cycle.

In one embodiment, the first determining module is further configured to acquire a desired first distance and a desired second distance, and set the desired first distance and the desired second distance as a desired distance when the length of the array corresponding to the distances is greater than the preset array length; and select a to-be-deleted value of the distances based on a preset filter condition, delete the to-be-deleted value of the distances, and acquire updated distances based on the desired distance.

In one embodiment, the second processing module 840 is further configured to acquire current position of each of the preset key points of the feet; and determine desired joint angles of the biped robot based on the current position of each of the preset key points of the feet and the desired position of the COM by using the preset inverse kinematics algorithm.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for controlling a biped robot to walk, executed by one or more processors of the biped robot, the method comprising:

acquiring distances between a center of mass (COM) of the biped robot and each of preset key points of feet of the biped robot, and acquiring an initial position of the COM of the biped robot;

calculating a position offset of the COM based on the distances;

adjusting the initial position of the COM based on the position offset of the COM to obtain a desired position of the COM of the biped robot; and determining desired walking parameters of the biped robot based on the desired position of the COM by using a preset inverse kinematics algorithm, and controlling the biped robot to walk by using the desired walking parameters;

wherein the preset key points comprise a key point of a left foot of the biped robot and a key point of a right foot of the biped robot, the distances comprise a first distance measured between the COM and the key point of the left foot along an x-axis, a second distance measured between the COM and the key point of the left foot along a y-axis, a third distance measured between the COM and the key point of the right foot along the x-axis, and a fourth distance measured between the COM and the key point of the right foot along the y-axis; and calculating the position offset of the COM based on the distances comprises:

determining a first position offset of the COM on the x-axis based on the first distance and the third distance;

determining average distances based on the second distance and the fourth distance, wherein the average distances comprise a first average distance and a second average distance, the first average distance is an average value of values of the second distance measured in a gait cycle, and the second average distance is an average value of values of the fourth distance measured in a gait cycle; and determining a second position offset of the COM on the y-axis based on the average distances and preset walking control parameters.

2. The computer-implemented method according to claim 1, wherein determining the second position offset of the COM on the y-axis comprises:
acquiring a current acceleration of the COM on the y-axis;
determining a y-axis calculation coefficient based on the first average distance and the second average distance; and
determining the second position offset of the COM on the y-axis based on the y-axis calculation coefficient, the preset walking control parameters, and the current acceleration of the COM on the y-axis.

3. The computer-implemented method according to claim 1, wherein acquiring the distances between a center of mass (COM) of the biped robot and each of preset key points of feet of the biped robot, comprises:
acquiring current walking parameters of the biped robot; and
calculating the distances between the COM and each of the preset key points based on the current walking parameters and preset length of link members by using a preset positive kinematics algorithm.

4. The computer-implemented method according to claim 1, wherein determining the average distances based on the second distance and the fourth distance, comprises:
determining the average distances based on the distances when a length of an array corresponding to the distances is equal to a preset array length, wherein the average distances are average values of values of the second distance and the fourth distance measured in a gait cycle.

5. The computer-implemented method according to claim 4, further comprising, after determining the average distance based on the distance,
acquiring a desired first distance and a desired second distance, and setting the desired first distance and the desired second distance as a desired distance when the length of the array corresponding to the distances is greater than the preset array length; and
selecting a to-be-deleted value of the distances based on a preset filter condition, deleting the to-be-deleted value of the distances, and acquiring updated distances based on the desired distance.

6. The computer-implemented method according to claim 1, wherein determining the desired walking parameters of the biped robot based on the desired position of the COM by using the preset inverse kinematics algorithm, comprises:
acquiring current position of each of the preset key points of the feet; and
determining desired joint angles of the biped robot based on the current position of each of the preset key points of the feet and the desired position of the COM by using the preset inverse kinematics algorithm.

7. A non-transitory computer-readable storage medium storing one or more programs to be executed in a biped robot, the one or more programs, when being executed by one or more processors of the biped robot, causing the biped robot to perform processing comprising:

acquiring distances between a center of mass (COM) of the biped robot and each of preset key points of feet of the biped robot, and acquiring an initial position of the COM of the biped robot;
calculating a position offset of the COM based on the distances;
adjusting the initial position of the COM based on the position offset of the COM to obtain a desired position of the COM of the biped robot; and
determining desired walking parameters of the biped robot based on the desired position of the COM by using a preset inverse kinematics algorithm, and controlling the biped robot to walk by using the desired walking parameters;
wherein the preset key points comprise a key point of a left foot of the biped robot and a key point of a right foot of the biped robot, the distances comprise a first distance measured between the COM and the key point of the left foot along an x-axis, a second distance measured between the COM and the key point of the left foot along a y-axis, a third distance measured between the COM and the key point of the right foot along the x-axis, and a fourth distance measured between the COM and the key point of the right foot along the y-axis; and calculating the position offset of the COM based on the distances comprises:
determining a first position offset of the COM on the x-axis based on the first distance and the third distance;
determining average distances based on the second distance and the fourth distance, wherein the average distances comprise a first average distance and a second average distance, the first average distance is an average value of values of the second distance measured in a gait cycle, and the second average distance is an average value of values of the fourth distance measured in a gait cycle; and
determining a second position offset of the COM on the y-axis based on the average distances and preset walking control parameters.

8. The non-transitory computer-readable storage medium according to claim 7, wherein determining the second position offset of the COM on the y-axis comprises:
acquiring a current acceleration of the COM on the y-axis;
determining a y-axis calculation coefficient based on the first average distance and the second average distance; and
determining the second position offset of the COM on the y-axis based on the y-axis calculation coefficient, the preset walking control parameters, and the current acceleration of the COM on the y-axis.

9. The non-transitory computer-readable storage medium according to claim 7, wherein acquiring the distances between a center of mass (COM) of the biped robot and each of preset key points of feet of the biped robot, comprises:
acquiring current walking parameters of the biped robot; and
calculating the distances between the COM and each of the preset key points based on the current walking parameters and preset length of link members by using a preset positive kinematics algorithm.

10. The non-transitory computer-readable storage medium according to claim 7, wherein determining the average distances based on the second distance and the fourth distance, comprises:
determining the average distances based on the distances when a length of an array corresponding to the distances is equal to a preset array length, wherein the average distances are average values of values of the second distance and the fourth distance measured in a gait cycle.

11. The non-transitory computer-readable storage medium according to claim 10, further comprising, after determining the average distance based on the distance,
acquiring a desired first distance and a desired second distance, and setting the desired first distance and the desired second distance as a desired distance when the length of the array corresponding to the distances is greater than the preset array length; and
selecting a to-be-deleted value of the distances based on a preset filter condition, deleting the to-be-deleted value of the distances, and acquiring updated distances based on the desired distance.

12. The non-transitory computer-readable storage medium according to claim 7, wherein determining the desired walking parameters of the biped robot based on the desired position of the COM by using the preset inverse kinematics algorithm, comprises:
acquiring current position of each of the preset key points of the feet; and
determining desired joint angles of the biped robot based on the current position of each of the preset key points of the feet and the desired position of the COM by using the preset inverse kinematics algorithm.

13. A biped robot comprising:
one or more processors;
a memory; and
one or more programs, wherein the one or more programs are stored in the memory and configured to be executed by the one or more processors, the one or more programs comprise:
instructions for acquiring distances between a center of mass (COM) of the biped robot and each of preset key points of feet of the biped robot, and acquiring an initial position of the COM of the biped robot;
instructions for calculating a position offset of the COM based on the distances;
instructions for adjusting the initial position of the COM based on the position offset of the COM to obtain a desired position of the COM of the biped robot; and
instructions for determining desired walking parameters of the biped robot based on the desired position of the COM by using a preset inverse kinematics algorithm, and controlling the biped robot to walk by using the desired walking parameters;
wherein the preset key points comprise a key point of a left foot of the biped robot and a key point of a right foot of the biped robot, the distances comprise a first distance measured between the COM and the key point of the left foot along an x-axis, a second distance measured between the COM and the key point of the left foot along a y-axis, a third distance measured between the COM and the key point of the right foot along the x-axis, and a fourth distance measured between the COM and the key point of the right foot along the y-axis; and calculating the position offset of the COM based on the distances comprises:
determining a first position offset of the COM on the x-axis based on the first distance and the third distance;
determining average distances based on the second distance and the fourth distance, wherein the average distances comprise a first average distance and a second average distance, the first average distance is an average value of values of the second distance measured in a gait cycle, and the second average distance is an average value of values of the fourth distance measured in a gait cycle; and
determining a second position offset of the COM on the y-axis based on the average distances and preset walking control parameters.

14. The biped robot according to claim 13, wherein determining the second position offset of the COM on the y-axis comprises:
acquiring a current acceleration of the COM on the y-axis;
determining a y-axis calculation coefficient based on the first average distance and the second average distance; and
determining the second position offset of the COM on the y-axis based on the y-axis calculation coefficient, the preset walking control parameters, and the current acceleration of the COM on the y-axis.

15. The biped robot according to claim 13, wherein acquiring the distances between a center of mass (COM) of the biped robot and each of preset key points of feet of the biped robot, comprises:
acquiring current walking parameters of the biped robot; and
calculating the distances between the COM and each of the preset key points based on the current walking parameters and preset length of link members by using a preset positive kinematics algorithm.

16. The biped robot according to claim 15, wherein the current walking parameters comprise joint angles and posture angles of the biped robot obtained through sensors of the biped robot.

17. The biped robot according to claim 13, wherein determining the average distances based on the second distance and the fourth distance, comprises:
determining the average distances based on the distances when a length of an array corresponding to the distances is equal to a preset array length, wherein the average distances are average values of values of the second distance and the fourth distance measured in a gait cycle.

18. The biped robot according to claim 17, further comprising, after determining the average distance based on the distance,
acquiring a desired first distance and a desired second distance, and setting the desired first distance and the desired second distance as a desired distance when the length of the array corresponding to the distances is greater than the preset array length; and
selecting a to-be-deleted value of the distances based on a preset filter condition, deleting the to-be-deleted value of the distances, and acquiring updated distances based on the desired distance.

19. The biped robot according to claim 18, wherein the to-be-deleted value of the distances comprises an earliest acquired value.

20. The biped robot according to claim 13, wherein determining the desired walking parameters of the biped robot based on the desired position of the COM by using the preset inverse kinematics algorithm, comprises:
acquiring current position of each of the preset key points of the feet; and
determining desired joint angles of the biped robot based on the current position of each of the preset key points of the feet and the desired position of the COM by using the preset inverse kinematics algorithm.

* * * * *